US008024283B2

(12) United States Patent
Callanan et al.

(10) Patent No.: US 8,024,283 B2
(45) Date of Patent: *Sep. 20, 2011

(54) ENFORCING RULE SELECTION ON USER INBOXES

(75) Inventors: Sean Callanan, Dublin (IE); Al Chakra, Apex, NC (US); Sonya Purcell, Tipperary (IE); Hugh Smyth, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/899,814

(22) Filed: Oct. 7, 2010

(65) Prior Publication Data
US 2011/0022674 A1 Jan. 27, 2011

Related U.S. Application Data

(63) Continuation of application No. 11/832,100, filed on Aug. 1, 2007, now Pat. No. 7,865,458.

(51) Int. Cl.
*G06F 17/00* (2006.01)
*G06N 5/02* (2006.01)
(52) U.S. Cl. ........... 706/47; 706/45; 706/46; 706/48; 706/60; 706/62; 709/217; 709/218; 709/219
(58) Field of Classification Search .................. None
See application file for complete search history.

(56) References Cited

U.S. PATENT DOCUMENTS

| 7,027,463 B2 * | 4/2006 | Mathew et al. ............... 370/463 |
| 7,743,103 B2 * | 6/2010 | Lauridsen et al. ............ 709/206 |
| 2002/0133624 A1 * | 9/2002 | Hashem et al. ............... 709/243 |
| 2003/0222765 A1 * | 12/2003 | Curbow et al. ............ 340/309.7 |
| 2004/0059790 A1 | 3/2004 | Austin-Lane et al. |
| 2004/0088359 A1 | 5/2004 | Simpson |
| 2005/0021485 A1 | 1/2005 | Nodelman et al. |
| 2006/0041505 A1 | 2/2006 | Enyart |
| 2006/0047758 A1 | 3/2006 | Sharma et al. |
| 2007/0226304 A1 | 9/2007 | Virk et al. |
| 2008/0109543 A1 | 5/2008 | Abanami et al. |

OTHER PUBLICATIONS www.en.wikipedia.org/wiki/Gmail, as archived on Jul. 19, 2006 (retrieved from www.archive.org), pp. 1-11.

* cited by examiner

*Primary Examiner* — Omar F Fernandez Rivas
(74) *Attorney, Agent, or Firm* — Thomas E. Lees, LLC (57) ABSTRACT

Rule selection is enforced on user email inboxes using an inbox monitor and administrative rules at an email server. The inbox monitor includes a first agent for identifying inactive user inboxes from email messages stored at the email database, and a second agent for identifying, from the inactive user inboxes identified by the first agent, user inboxes without appropriate user rules activated. For each user inbox identified by the second agent, administrative rules are applied to the user inbox if the user inbox has been inactive for at least a predetermined period of time. If the user inbox has not been inactive for at least the predetermined period of time, a notification message is sent to a user associated with the user inbox. The notification message informs the user that administrative rules will be applied to the user inbox if appropriate user rules are not activated.

12 Claims, 5 Drawing Sheets

ENFORCING RULE SELECTION ON USER INBOXES

CROSS REFERENCE TO RELATED APPLICATION

This application is a continuation of U.S. patent application Ser. No. 11/832,100, entitled ENFORCING RULE SELECTION ON USER INBOXES, filed Aug. 1, 2007, now allowed, the entire disclosure of which is incorporated by reference herein.

BACKGROUND OF THE INVENTION

Some email client applications allow users to define and set rules for managing their inbox. For example, rules can be set so that certain email messages are moved to a particular folder, deleted, flagged, or redirected, based on set criteria. Other example rules include sending an automatic reply to the sender, and sending window or sound notifications to the user when messages arrive that match the set criteria. These rules are useful tools for managing email inboxes, especially when a user is on vacation or on leave.

When a user goes on an extended leave of absence, the user can define and activate rules to help manage his/her inbox while the user is away. However, if the leave is unexpected, the user may not have these rules activated prior to commencing the leave. Email messages to the user's inbox would thus not be managed while the user is away. For example, message senders may not be notified of the user's absence if no Out of Office message rule has been activated; the user's allotted storage on the email server database may become full before the user returns, preventing further messages from reaching the user; and messages with virus content will sit in the email server database until opened or deleted. When the user returns and accessed his/her inbox, the user would be required to spend a considerable amount of time reviewing and organizing messages. The failure to activate the user rules for his/her email inbox thus results in stress on the email servers and the user upon his/her return.

BRIEF SUMMARY OF THE INVENTION

According to aspects of the present invention, a computer program product to enforce rule selection on user email inboxes, comprises a computer readable storage medium having computer readable program code embodied therewith. The computer readable program code comprises computer readable program code configured to identify inactive user inboxes stored at an email database that do not have appropriate user rules activated. For example, the computer program product may further comprise computer readable program code configured to run a first agent on email messages stored at the email database to identify the inactive user inboxes and computer readable program code configured to run a second agent on the inactive user inboxes identified by the first agent, to identify the inactive user inboxes that do not have appropriate user rules activated.

The computer program product further comprises computer readable program code configured to determine, for each inactive user inbox identified, if the user inbox has been inactive for at least a predetermined period of time and computer readable program code configured to apply administrator rules to the user inbox if the user inbox has been inactive for at least the predetermined period of time. Moreover, the computer program product may comprise computer readable program code configured to apply administrator rules that vary based on a role in an organization of a user associated with the user inbox. Still further, the computer program product may comprise computer readable program code configured to send a notification message to a user associated with the user inbox if the user inbox has not been inactive for at least the predetermined period of time, the notification message informing the user that the administrator rules will be applied to the user inbox if appropriate user rules are not activated.

DETAILED DESCRIPTION OF THE INVENTION

The present invention provides a method and system for enforcing rule selection on user email inboxes. The following description is presented to enable one of ordinary skill in the art to make and use the invention and is provided in the context of a patent application and its requirements. Various modifications to the embodiment will be readily apparent to those skilled in the art and the generic principles herein may be applied to other embodiments. Thus, the present invention is not intended to be limited to the embodiment shown but is to be accorded the widest scope consistent with the principles and features described herein.

The invention comprises an inbox monitor at an email server. The inbox monitor identifies inactive user inboxes that do not have appropriate user rules activated. If an inactive user inbox, that does not have appropriate user rules activated, has been inactive for at least a predetermined period of time, administrator rules are applied to the inactive user inbox.

Figure 1:
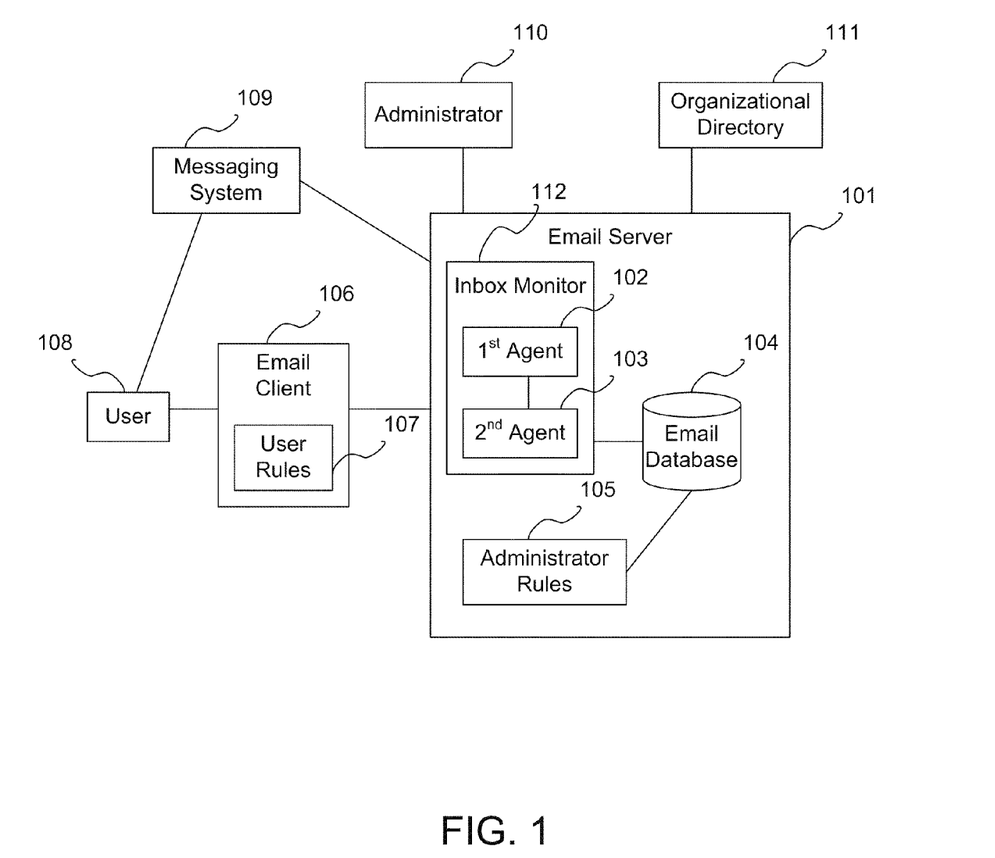
FIG. 1 illustrates an exemplary system for enforcing rule selection on user email inboxes.

FIG. 1 illustrates an exemplary system for enforcing rule selection on user email inboxes. The system includes an email server 101 for providing email service to users 108 at email clients 106. Although the email server 101 is illustrated as a single server, one of ordinary skill in the art will understand that the email service can be provided by a plurality of email servers without departing from the spirit and scope of the invention. The email server 101 stores user email messages in an email database 104. The email server 101 includes an inbox monitor 112. In one exemplary embodiment, the inbox monitor 112 includes a first agent 102 and a second agent 103 for managing the email messages stored at the email database 104, as described further below. The agents 102-103 are batch files that run with code to execute against the email server 101 with certain criteria attached to identify information. Although a plurality of separate agents 102-103 are described in the exemplary embodiment, one of ordinary skill in the art will understand that a single agent can be used to provide the same functionality without departing from the spirit and scope of the invention.

The email server 101 is managed by an administrator 110 and further includes administrator rules 105, which can be applied to any of the messages stored at the email database 104. The email server 101 has access to at least one message system 109, such as Short Messaging System (SMS) or text messaging system, wireless network, pager, email, Radio Frequency Identifier (RFID), etc., for sending messages to users 108. The user 108 at the email client 106 can define and activate one or more user rules 107 for managing the user's email inbox. If the email service is being provided to a plurality of users in an organization, then the email server 101 can have access to an organizational directory 111, which contains information on the personnel of the organization.

Figure 2:
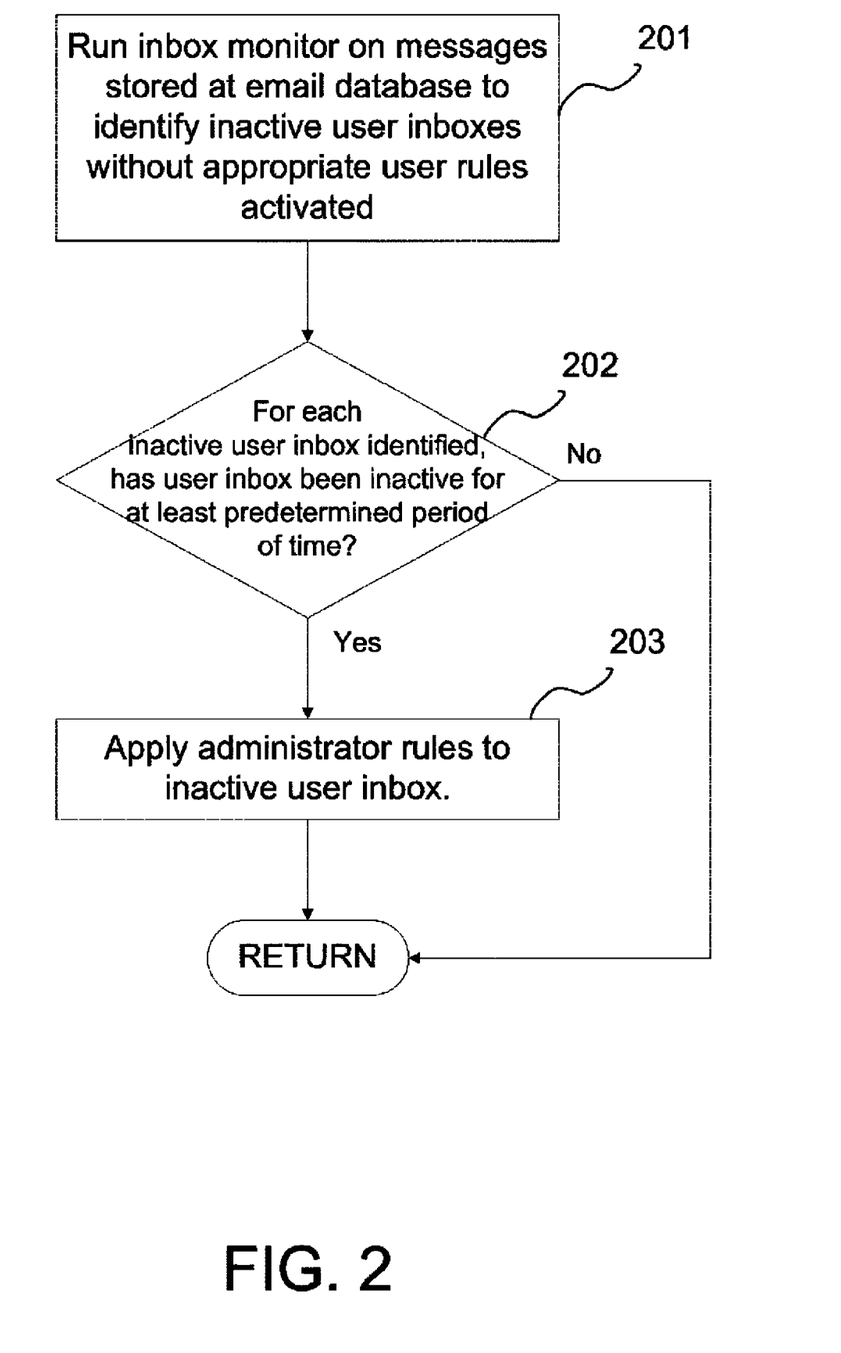
FIG. 2 is a flowchart illustrating an exemplary method for enforcing rule selection on user email inboxes.

FIG. 2 is a flowchart illustrating an exemplary method for enforcing rule selection on user email inboxes. Referring to both FIGS. 1 and 2, the inbox monitor 112 at the email server 101 is run on the messages stored at the email database 104 to identify inactive user inboxes that do not have appropriate user rules 107 activated (step 201). For each inactive user inbox identified, the amount of time that the user inbox has been inactive is determined. If the user inbox has been inactive for at least a predetermined period of time (step 202), the administrator rules 105 are applied to the inactive user inbox (step 203).

The criteria for inactivity of a user inbox are configurable. For example, the first agent 102 can be configured to identify user inboxes to which its associated user has not accessed for at least a predetermined period of time.

The criteria for appropriateness of the user rules are also configurable, depending on the limits and requirements of the email server 101. For example, user rules are deemed inappropriate if no user rules are activated or the user rules lack a threshold of restrictiveness. For example, user rules are deemed to lack the threshold of restrictiveness if no Out of Office message is activated or no user rules for deleting email are activated. If the user rules 107 are deemed to not be restrictive enough, the administrator rules 105 are applied to the user inbox, either in addition to or instead of the user rules 107.

Figure 3:
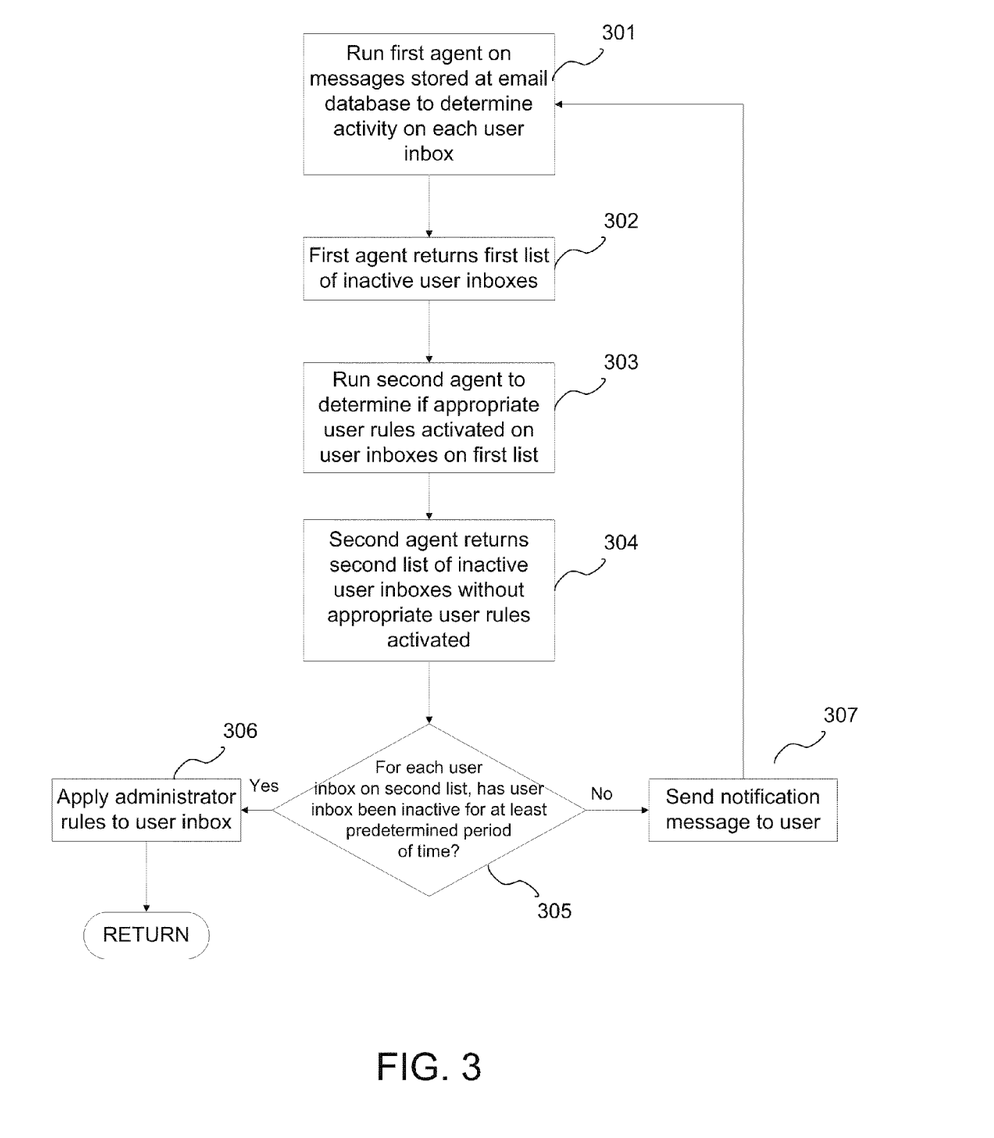
FIG. 3 is a flowchart illustrating in more detail the exemplary embodiment of the method for enforcing rule selection on user email inboxes.

FIG. 3 is a flowchart illustrating in more detail the exemplary embodiment of the method for enforcing rule selection on user email inboxes. The first agent 102 at the email server 101 is run on the messages stored at the email database 104 to determine the activity on each user inbox (step 301). The first agent 102 returns a first list of inactive user inboxes (step 302). The second agent 103 is then run on the first list to determine if appropriate user rules 107 have been activated on the user inboxes on the first list (step 303). The second agent 103 returns a second list of inactive user inboxes without appropriate user rules 107 activated (step 304).

In the exemplary embodiment, the administrator 110 reviews the second list to determine if any of the user inboxes on the second list has been inactive for at least a predetermined period of time (step 305). If not, then the administrator 110 sends a notification message using the messaging system 109 to the user 108 associated with the inactive user inbox (step 307). The message notifies the user 108 that administrator rules 105 would be applied to the user inbox if the user 108 does not activate appropriate user rules 107. If the user 108 does not activate appropriate user rules 107, then the user inbox will continue to be on the first and second lists in subsequent runs of the first and second agents 102-103 (steps 301-304). Once the inactive user inbox has been on the second list for at least a predetermined period of time (step 305), the administrator rules 105 are applied to the user inbox (step 306). If the user 108 responds to the administrator's message by activating user rules 107, then the user inbox would cease to be on the first list. Thus, the administrator rules 105 would not be applied to this user inbox.

For example, assume that a user 108 has been on an unexpected leave of absence due to illness for over 4 weeks. The user 108 did not have the opportunity to apply any user rules 107 to his inbox. Assume also that the first and second agents 102-103 are run once a week as part of the routine management of the email system. During week one of the user's absence, the first agent 102 determines that the inbox of the user 108 is inactive, and the first agent 102 returns the first list with the user's inbox listed (steps 301-302). The second agent 103 is run against the first list, and the second agent 103 determines that the inbox of the user 108 has no user rules 107 activated (step 303). The second agent 103 returns the second list with the user's inbox listed (step 304). The administrator 110 reviews the second list and determines that the user's inbox has been on the second list for one week. Assuming that the predetermined time period of allowed inactivity is configured to be four weeks, the administrator rules 105 are not yet applied to the user inbox. Instead, a notification text message is sent to the user's cellular phone, using messaging system 109 (step 307).

As long as the user 108 fails to access his inbox and fails to activate appropriate user rules 107, the user's inbox will continue to be listed on the first and second lists on subsequent runs of the first and second agents 102-103. At each return of the second list, a notification message can be sent to the user 108 using the messaging system 109 (step 307). Alternative, only one notification message is sent to the user 108 even though the user inbox is listed on the second list for multiple weeks.

Assuming that after the fourth week of the user' absence, the first agent 102 determines that the inbox of the user 108 is still inactive, the first agent 102 returns the first list with the user's inbox listed (steps 301-302). The second agent 103 is run against the first list, and the second agent 103 determines that the inbox of the user 108 still has no user rules 107 activated (step 303). The second agent 103 returns the second list with the user's inbox listed (step 304). The administrator 110 sees that the inbox for the user 108 has been on the second list for over four weeks (step 305) and applies the administrator rules 105 to the user's inbox (step 306).

Figure 4:
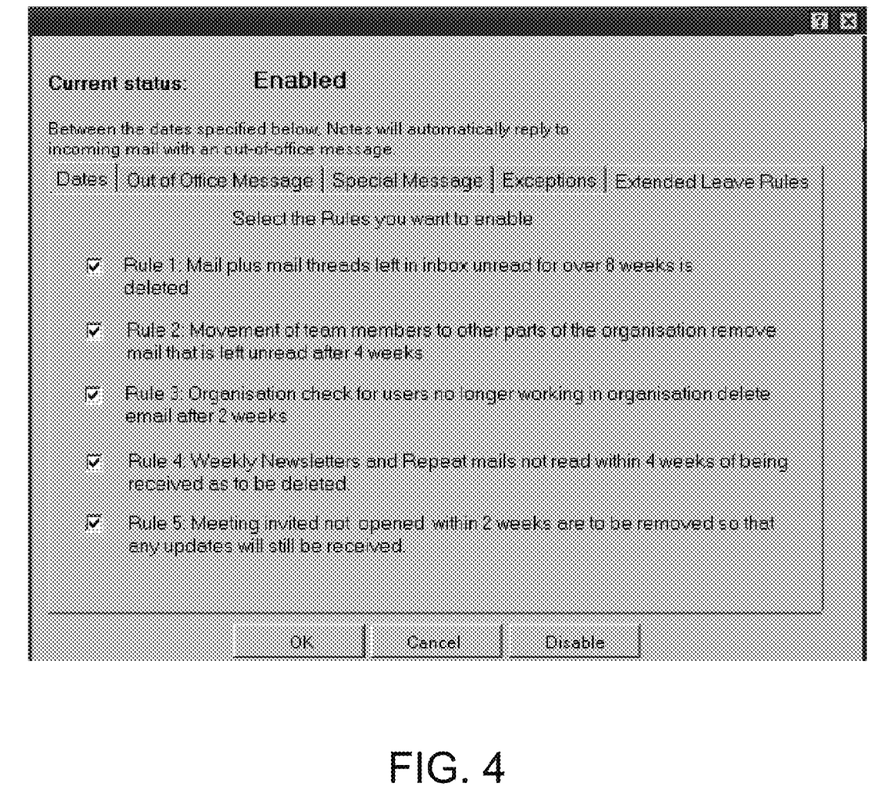
FIG. 4 illustrates example administrator rules that can be applied to an inactive user email inbox.

FIG. 4 illustrates example administrator rules that can be applied to an inactive user email inbox. The example administrator rules include: delete any email or email thread in the inbox that has been unread for over 8 weeks; remove email that is left unread after 4 weeks from team members who have moved to other parts of the organization; delete email after 2 weeks from users who are no longer working in the organization; delete weekly newsletters and repeat emails not read within 4 weeks of being received; and remove meeting invites not opened within 2 weeks of being received. Any combination of these rules can be applied to an inactive user email inbox by selecting or deselecting the rules.

In another exemplary embodiment, the email server 101 tracks the amount of time a user inbox is inactive with no user rules activated. Once the email server 101 determines that the user inbox has been inactive for at least the predetermined period of time (step 305), the email server 101 automatically applies the administrator rules 105 to the user inbox (step 306) without first sending the user a notification message. The user 108 can be previously informed of the administrator rules 105 and that these rules 105 would be applied if the user's inbox is inactive without appropriate user rules activated for a period of time.

In one exemplary embodiment, the administrator rules 105 can vary based on the role of the user within the organization.

Here, the administrator 110 checks the organizational chart 111 to determine where the user falls in the organizational hierarchy. The administrator 110 then applies the administrator rules 105 accordingly. For example, the handling of messages for a user in the legal department is different than for a user in the human resources department, due to the different documentation requirements for each department. For another example, how a message is marked, moved or forwarded depends on the hierarchical level of the sender in the organization. If a message is received from someone higher up in the organizational hierarchy than the user, then the message can be flagged as important.

In an alternative exemplary embodiment, if a user inbox on the second list has not been inactive for at least the predetermined period of time, the administrator 110 contacts the manager or supervisor of the user associated with the user inbox to determine the user's status. If the user is determined to be on leave due to illness or some other extenuating circumstances, then the administrator 110 can proceed with applying the administrator rules 105 without waiting for the user inbox to be inactive for at least the predetermined period of time.

With either user rules 107 or administrator rules 105 applied to an inactive user inbox, stress on the email server 101 is reduced. Upon the user's return to work, the user's inbox is also more manageable.

Figure 5:
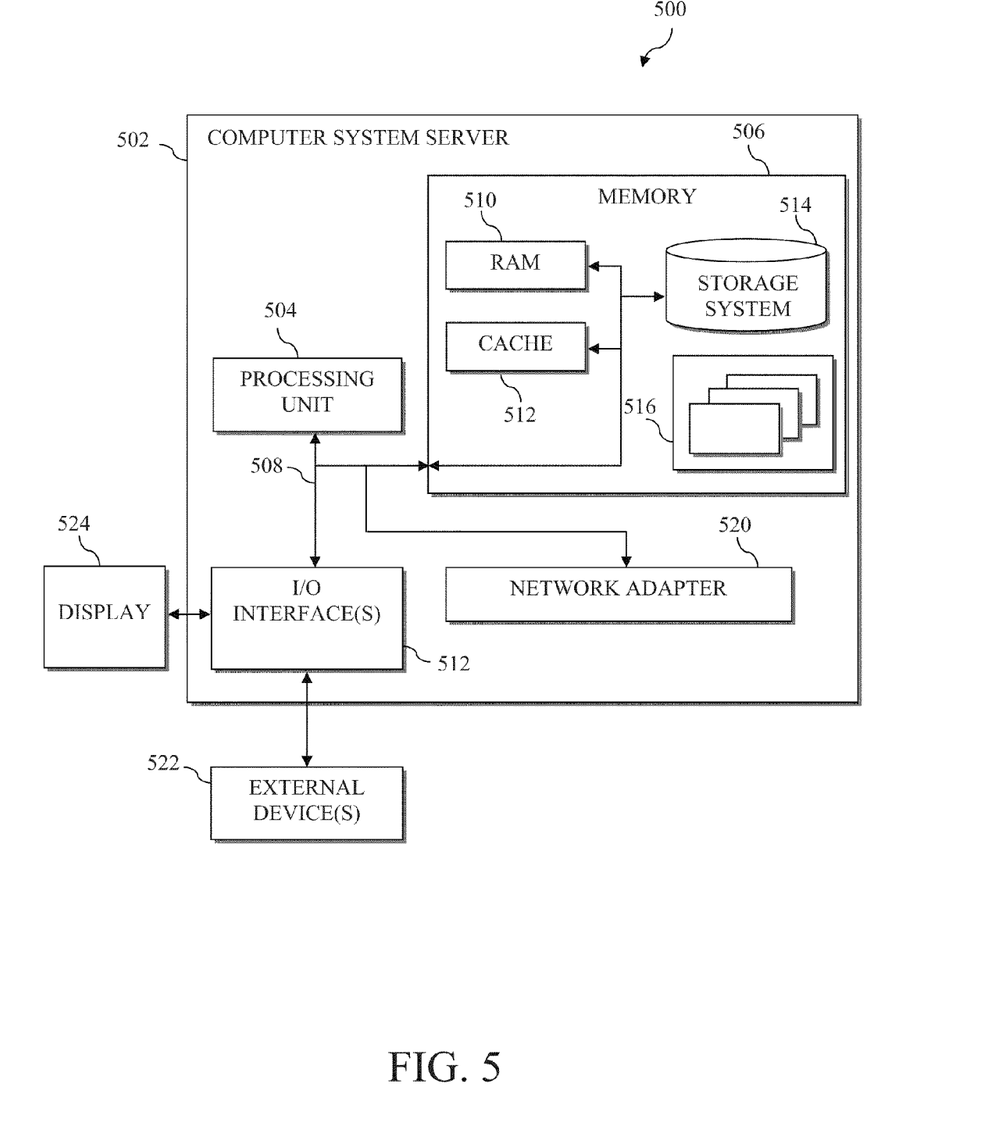
FIG. 5 is a block diagram of a computer system having a computer readable storage medium for implementing functions according to various aspects of the present invention as described in greater detail herein.

Referring to FIG. 5, a block diagram of a data processing system 500 implemented as a server 502 is depicted in accordance with aspects of the present invention. The server 502 is operational with numerous other general purpose or special purpose computing system environments or configurations. Moreover, the server 502 may be described in the general context of computer system executable instructions, such as program modules, being executed by a computer system. Generally, program modules may include routines, programs, objects, components, logic, data structures, and so on that perform particular tasks or implement particular abstract data types.

The components of the server 502 may include, but are not limited to, one or more processors or processing units 504, a system memory 506, and a bus 508 that couples various system components including system memory 506 to the processor 504. The memory 506 can include computer system readable media in the form of volatile memory, such as random access memory (RAM) 510 and/or cache memory 512. The memory 506 may also include other removable/non-removable, volatile/non-volatile computer system storage media, such as a storage system 514, e.g., one or more hard drives. Memory 506 may also include at least one computer readable storage medium 516 having computer readable program code embodied therewith, the computer readable program code comprising computer readable program code configured to carry out the functions of embodiments of the invention described more fully herein.

The server 502 may also comprise input/output (I/O) interface(s) 518 and/or a network adapter 520 that communicate with the processor 504 across the bus 508. The server 502 may also interface with external devices 522 and/or a display 524. Other hardware and/or software components could be used in conjunction with server 502.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, a tangible article produced from raw or prepared storage medium materials by giving to these materials new forms, qualities, properties, or combinations, by virtue of at least one stored computer program product thereon. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. A computer readable signal medium may be any computer readable medium that is not a computer readable storage medium and that can communicate, propagate, or transport a program for use by or in connection with an instruction execution system, apparatus, or device.

Computer program code for carrying out operations for aspects of the present invention may be written in any combination of one or more programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. Aspects of the invention were chosen and described in order to best explain the principles of the invention and the practical application, and to enable others of ordinary skill in the art to understand the invention for various embodiments with various modifications as are suited to the particular use contemplated.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A computer program product to enforce rule selection on user email inboxes, comprising:
a computer readable storage medium having computer readable program code embodied therewith, the computer readable program code comprising:
computer readable program code configured to identify inactive user inboxes stored at an email database that do not have appropriate user rules activated having:
computer readable program code configured to run a first agent on email messages stored at the email database to identify the inactive user inboxes; and
computer readable program code configured to run a second agent on the inactive user inboxes identified by the first agent, to identify the inactive user inboxes that do not have appropriate user rules activated;
computer readable program code configured to determine, for each inactive user inbox identified, if the user inbox has been inactive for at least a predetermined period of time; and
computer readable program code configured to apply administrator rules to the user inbox if the user inbox has been inactive for at least the predetermined period of time.

2. The computer program product of claim 1, wherein the computer readable program code configured to run a first agent comprises computer readable program code configured to return a first list comprising the inactive user inboxes.

3. The computer program product of claim 1, wherein the computer readable program code configured to run a second agent comprises computer readable program code configured to return a second list comprising the inactive user inboxes without appropriate user rules activated.

4. The computer program product of claim 1, wherein the computer readable program code configured to run a first agent on email messages stored at the email database to identify the inactive user inboxes, comprises:
computer readable program code configured to identify inactive user inboxes that have not been accessed for a second predetermined period of time.

5. The computer program product of claim 1, wherein the computer readable program code configured to run a second agent to identify the inactive user inboxes that do not have appropriate user rules activated comprises:
computer readable program code configured to identify inactive user inboxes that have no user rules activated or have user rules that do not meet a threshold of restrictiveness.

6. The computer program product of claim 1, wherein the computer readable program code configured to determine, for each inactive user inbox identified, if the user inbox has been inactive for at least a predetermined period of time, comprises:
computer readable program code configured to send a notification message to a user associated with the user inbox if the user inbox has not been inactive for at least the predetermined period of time, the notification message informing the user that the administrator rules will be applied to the user inbox if appropriate user rules are not activated.

7. A computer program product to enforce rule selection on user email inboxes, comprising:
a computer readable storage medium having computer readable program code embodied therewith, the computer readable program code comprising:
computer readable program code configured to identify inactive user inboxes stored at an email database that do not have appropriate user rules activated;
computer readable program code configured to determine, for each inactive user inbox identified, if the user inbox has been inactive for at least a predetermined period of time; and computer readable program code configured to apply administrator rules to the user inbox if the user inbox has been inactive for at least the predetermined period of time, wherein the administrator rules applied to the user inbox varies based on a role in an organization of a user associated with the user inbox.

8. A computer program product to enforce rule selection on user email inboxes, comprising:

a computer readable storage medium having computer readable program code embodied therewith, the computer readable program code comprising:

computer readable program code configured to run a first agent on email messages stored at an email database;

computer readable program code configured to return a first list by the first agent, the first list comprising inactive user inboxes;

computer readable program code configured to run a second agent on the first list;

computer readable program code configured to return a second list by the second agent, the second list comprising inactive user inboxes without appropriate user rules activated; and computer readable program code configured to determine, for each user inbox on the second list, if the user inbox has been inactive for at least a predetermined period of time, computer readable program code configured to apply administrator rules to the user inbox if the user inbox has been inactive for at least the predetermined period of time, and computer readable program code configured to send a notification message to a user associated with the user inbox if the user inbox has not been inactive for at least the predetermined period of time, the notification message informing the user that the administrator rules will be applied to the user inbox if appropriate user rules are not activated.

9. The computer program product of claim 8, wherein the computer readable program code configured to return a first list by the first agent, the first list comprising inactive user inboxes comprises computer readable program code configured to identify inactive user inboxes that have not been accessed for a second predetermined period of time.

10. The computer program product of claim 8, wherein the computer readable program code configured to return a second list by the second agent, the second list comprising inactive user inboxes without appropriate user rules activated, comprises computer readable program code configured to identify inactive user inboxes that have no user rules activated or have user rules that do not meet a threshold of restrictiveness.

11. The computer program product of claim 8, wherein the computer readable program code configured to apply administrator rules to the user inbox comprises computer readable program code configured to apply administrator rules to the user inbox that varies based on a role in an organization of the user associated with the user inbox.

12. The computer program product of claim 8, wherein the computer readable program code configured to determine, for each user inbox on the second list, if the user inbox has been inactive for at least a predetermined period of time comprises:

computer readable program code configured to determine if the user associated with the user inbox is on leave, if the user inbox has not been inactive for at least the predetermined period of time; and computer readable program code configured to apply the administrator rules to the user inbox if the user is on leave.

* * * * *